United States Patent [19]

Nomura et al.

[11] 4,281,919

[45] Aug. 4, 1981

[54] COPYING APPARATUS PROVIDED WITH AN AUTOMATIC ORIGINAL FEEDING DEVICE

[75] Inventors: Akihiro Nomura, Kawasaki; Kimiaki Hayakawa, Tokyo; Shigeru Yoshimura, Yokohama; Shunichi Masuda, Tokyo; Katsuichi Shimizu, Hoya; Toshiaki Yagasaki, Hino, all of Japan

[73] Assignee: Canon Kabushiki Kaisha, Tokyo, Japan

[21] Appl. No.: 83,779

[22] Filed: Oct. 11, 1979

[30] Foreign Application Priority Data

Oct. 14, 1978 [JP] Japan ................................ 53-126706
Oct. 14, 1978 [JP] Japan ................................ 53-126742
Oct. 14, 1978 [JP] Japan ................................ 53-126744

[51] Int. Cl.³ ........................ G03B 27/48; G03B 27/50

[52] U.S. Cl. ........................................... 355/50; 271/6; 355/3 SH; 355/14 SH

[58] Field of Search .................. 355/3 SH, 14 SH, 50, 355/51, 8, 11, 65, 66; 271/6

[56] References Cited

U.S. PATENT DOCUMENTS 4,170,414 10/1979 Hubert et al. ...................... 355/3 SH
4,176,945 12/1979 Holzhauser et al. ........ 355/14 SH X

*Primary Examiner*—Richard A. Wintercorn
*Attorney, Agent, or Firm*—Fitzpatrick, Cella, Harper & Scinto

[57] ABSTRACT

A copying apparatus is provided with original feeding device for feeding an original to an exposure position and discharging the original from the exposure position after termination of exposure, image formation device for forming an image corresponding to the image of the original, start instruction device for instructing the apparatus to start copying, detector for detecting the original placed at the exposure position when copy start has been instructed by the instruction means, and control device for causing the original feeding device to discharge the original after a predetermined number of copies have been produced for the original when there is an output of the detector.

30 Claims, 22 Drawing Figures

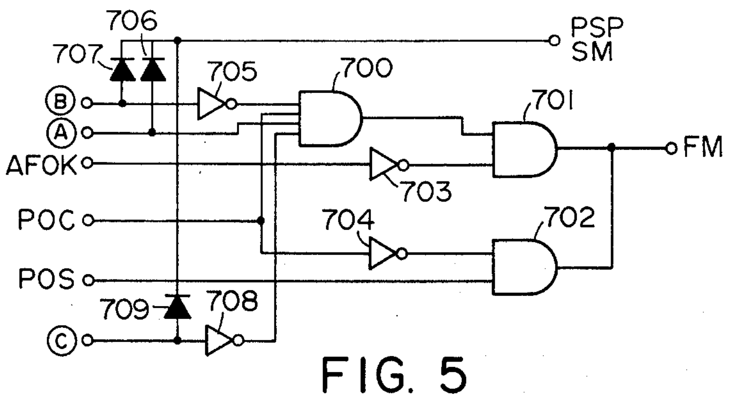
FIG. 5
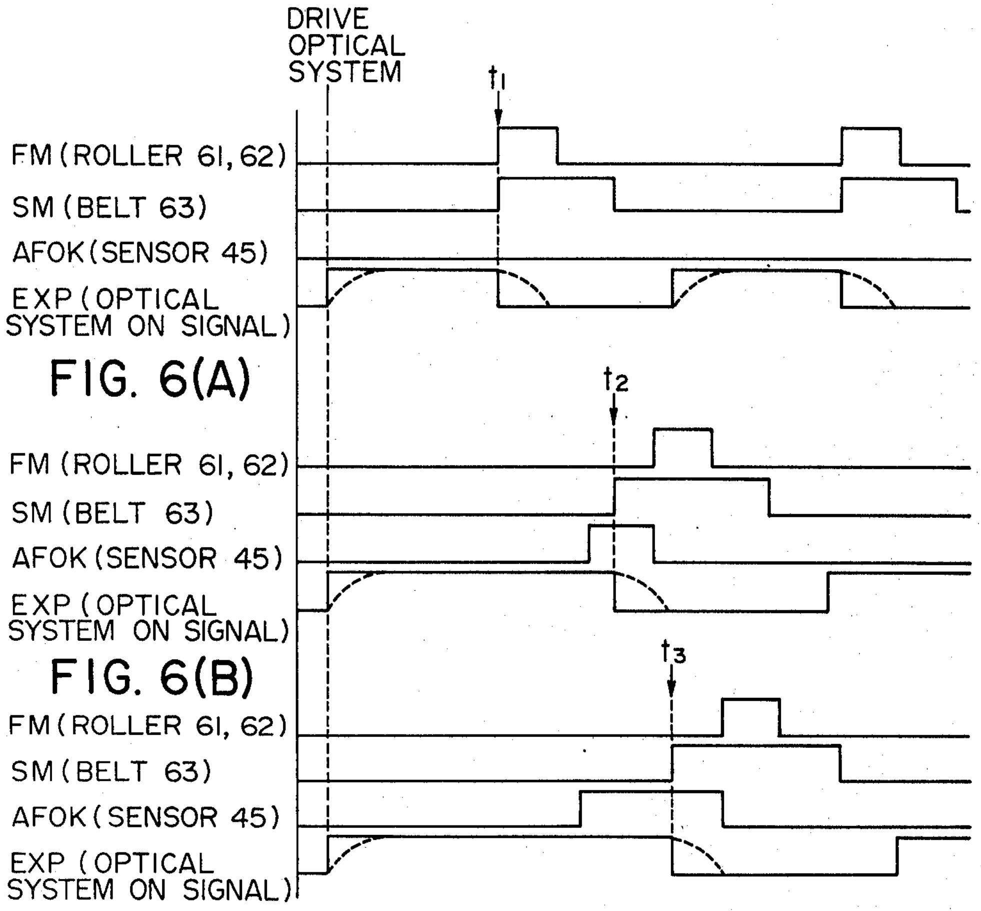
FIG. 6(A)
FIG. 6(B)
FIG. 6(C)

COPYING APPARATUS PROVIDED WITH AN AUTOMATIC ORIGINAL FEEDING DEVICE

BACKGROUND OF THE INVENTION

1. Field of the Invention

This invention relates to a copying apparatus provided with an automatic original feeding device for automatically feeding an original to an exposure position.

2. Description of the Prior Art

In a conventional copying apparatus having an automatic original feeding device, where an original is placed at an exposure position, if a copy start instruction is effected, discharge of the original at the exposure position is inhibited and the next original is fed to a feeding position to cause jam of the original and damage the original or the original at the exposure position is discharged and the next original is fed to the exposure position without the first original at the exposure position being copied. This has required the user to carry out a very cumbersome procedure of returning the discharged original to the original feeding position.

Also, in the past, when interruption of the operation of the copying apparatus body has been instructed, only the portion of the apparatus which is concerned with image formation has been stopped with the original left at the exposure position. Since the user effects the interruption instruction when the original at the exposure position is not necessary, it has been a cumbersome procedure to take the original out of the automatic feeding device.

Generally, a copying apparatus having the automatic original feeding function of automatically feeding sheet-like originals has the ordinary copying function of effecting exposure with a thick original such as a book or the like placed on an original supporting table so that such a thick original may also be copied. Heretofore, however, in such a copying apparatus, originals have been automatically fed even when the next user has placed, by mistake, the originals in a container portion for containing originals after copying has been terminated by automatic original feeding. This has led to wasteful copies or, when the original has not been properly placed, damaged originals.

Where originals of a relatively large size are fed, a sufficient feeding interval cannot be secured between an already copied original and the next original, so that jam tends to occur or such a situation occurs that the copied original has not yet been discharged copletely when the next original has been set to the exposure position. To avoid such situation, it would occur to mind to discharge the next original after the copied original has been discharged, but if this was done, the feeding interval would widen so much that no improvement in copying speed could be expected.

Generally, in a copying apparatus or the like wherein copying is effected with an original placed on an original supporting surface, the original must be positioned because it must be placed at a predetermined exposure area on the original supporting surface. This is because the exposure area for each original size (for example, A4 or B4) is determined on the original supporting surface 101 (see FIG. 8) and if an original is placed in deviated relationship with such exposure area, the image of the original as so deviated is copied on copy paper and the information of the original fails to be copied at an accurate position. In such case, positioning of the original is usually accomplished by causing the original to bear against one end of the original supporting surface 101, for example, the end 102 of the original supporting surface 101 and a positioning plate 103 (FIG. 8).

However, in an automatic original feeding device for automatically feeding a plurality of sheet originals as shown in FIG. 9, the sheet originals are slidingly conveyed on the original supporting surface 101 and therefore, when the sheet original is so conveyed, the resistance thereof to the direction of conveyance differes, for some reason or other, between that side of the original which contacts the positioning plate 103 and the opposite side, so that the sheet original is moved obliquely or, when deviated from the conveyance path, the sheet original may touch any obstacle which may stand near the conveyance path, so that the oblique movement of the sheet original may be promoted or the sheet original may become wrinkled or even broken. In FIG. 8, when an original is conveyed in the direction of arrow 120 by the automatic original feeding device, the sheet original as conveyed may touch the original positioning plate 103 and this may lead to the danger of the sheet original being damaged as described above. Accordingly, no safety of the original is ensured in such a condition and therefore, the positioning plate 103 and the original must be kept apart from each other during the conveyance of the original. As a method therefor, it first occurs to mind to deviate the conveyance path of the sheet original from the positioning plate 103, but since the sheet original cannot be accurately placed at the exposure position, part of the information of the sheet original may fail to be copied. Secondly, if the positioning plate 103 is removed and the original supporting surface is printed with a positioning display line, the exposure position may be determined accurately but, when a thick original such as a book or the like which cannot be handled by the automatic original feeding device is to be copied, it becomes impossible or difficult to position the original by causing the original to bear against the end of the original supporting surface.

In such a copying apparatus as previously described, there is a glass platen on which an original may rest so that the original may be optically scanned. In an automatic original feeding device designed such that a thin original (usually, a sheet of about 30 $g/m^2$) conveyed on such platen surface bears against stop pawls lowered to the platen surface and comes to a balt at a predetermined position, if the width of the stop pawls 202 and 203 is narrow as shown in FIG. 15*a*, the force acting on a unit length of the leading end of the original 201 which bears against the pawls is so great that the portion of the leading end of the original which bears against the pawls may become bulged or broken. In FIG. 15*b*, the original is designated by 201 and the stop pawls are designated by 202*a* and 203*a*. If the width of the stop pawls is increased, the force exerted on the portion of the original 201 which bears against the stop pawls is dispersed as shown in FIG. 15*b*, thus reducing the damage imparted to the leading end of the original. However, it is necessary to bring the stop pawls 202*a* and 203*a* having a great width into uniformly intimate contact with the platen surface. If the pawls are in intimate contact with the platen surface as shown in FIG. 16*a*, the leading end of the original can uniformly touch the entire width of the pawls, whereas if the pawl 202*a* is not in uniformly intimate contact with the platen surface 204 but obliquely touches such platen surface as shown in FIG. 16*b*, the original 201 will only touch a part of the pawls and the leading end of the original will be damaged for the reason set forth above.

SUMMARY OF THE INVENTION

It is an object of the present invention to provide a copying apparatus provided with an automatic original feeding device which eliminates the above-noted disadvantages peculiar to the prior art.

More particularly, it is an object of the present invention to provide a copying apparatus in which, if an original is placed at the exposure position when copy start instruction has been given, the original at the exposure position is detected by detector means and a predetermined number of copies are produced for said original, whereafter the original is discharged by the original feeding means.

It is also an object of the present invention to provide a copying apparatus having feeding means for feeding an original to the exposure position and discharging the original therefrom, image formation means for forming a copy image, and instruction means for instructing interruption of operation during the operation of the image formation means and wherein the original at the exposure position is discharged by the instruction from said instruction means.

It is a further object of the present invention to provide a copying apparatus having container means for containing originals therein, feeding means for feeding the originals from said container means to the exposure position, and setting means for setting said feeding means to its usable condition, in which said feeding means is capable of feeding, when the originals have been set in said container means and wherein after said setting means has been set to its usable condition and when the originals are not set in said container means, said usable condition is released.

It is still a further object of the present invention to provide a copying apparatus having feeding means for feeding a plurality of originals to the exposure position one by one, light scanning means for exposing to light and reciprocally scanning the original at the exposure position, and detector means for detecting the light from said light scanning means and wherein after said original has been scanned, said feeding means is temporally inhibited from feeding the next original by the output of said detector means.

It is a further object of the present invention to provide an original positioning device for positioning an original on the original supporting surface, that is, an original positioning device which effects the positioning operation only when necessary, namely, when a thick original is copied (copying of sheet originals is also possible) and the automatic original feeding device is not used and which releases the positioning operation when unnecessary, namely, when sheet originals are conveyed by the automatic original feeding device, thereby acting so as not to restrain the conveyance of sheet originals.

It is a further object of the present invention to provide a construction which makes a stop pawl for stopping an original at the exposure position uniformly bear against the platen surface or a surface adjacent thereto. It is also an object of the present invention to provide a construction which makes an original coming to the stop pawl stop at a proper position without an unreasonable force acting on a predetermined position on the platen surface.

The invention will become more fully apparent from the following detailed description thereof taken in conjunction with the accompanying drawings.

BRIEF DESCRIPTION OF THE DRAWINGS

FIGS. 4 and 5 are diagrams of the control circuit of the automatic original feeding device.

FIG. 6 is a drive timing chart of the setter side belt and the feeder side rollers.

DESCRIPTION OF THE PREFERRED EMBODIMENTS

Figure 1:
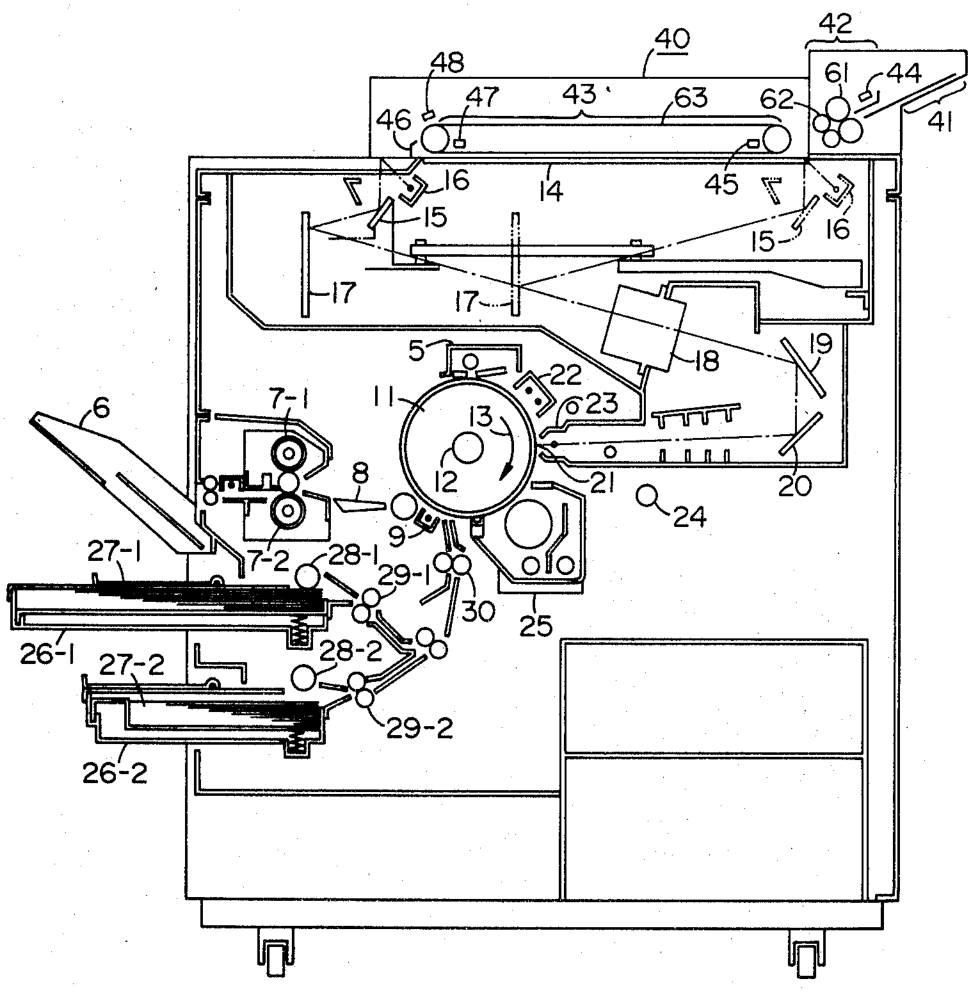
FIG. 1 is a cross-sectional view of the copying apparatus according to an embodiment of the present invention.

FIG. 1 is a cross-sectional view of a copying apparatus to which the present invention is applicable.

A drum 11, whose surface comprises a three-layer photosensitive medium using a CdS photoconductive material, is rotatably supported on a shaft 12 and starts to rotate in the direction of arrow 13 by a copy instruction.

When the drum 11 is rotated to a predetermined position, an original placed on an original carriage glass plate (platen) 14 is illuminated by an illuminating lamp 16 integrally formed with a first scanning mirror 15 and the reflected light therefrom is scanned by the first scanning mirror 15 and a second scanning mirror 17. The first scanning mirror 15 and the second scanning mirror 17 are moved at a velocity ratio of 1:½, whereby the original may be scanned with the length of the light path forward of a lens 18 being always maintained constant.

The said reflected light image passes through the lens 18 and a third mirror 19 and then through a fourth mirror 20 and is focused on the drum 11 at an exposure station 21.

The drum 11 is charged (for example, to the positive polarity) by a primary charger 22, whereafter it is slit-exposed to the image illuminated by the illuminating lamp 16, at the exposure station 21.

Simultaneously therewith, AC discharge or discharge of the opposite polarity to the primary charge (for example, of the negative polarity) is effected on the drum 11 by a discharger 23, whereafter the drum is subjected to whole surface exposure by a whole surface exposure lamp 24, whereby an electrostatic latent image of high contrast is formed on the drum 11. The electrostatic latent image on the photosensitive drum 11 is then visualized into a toner image by a developing device 25.

Transfer paper 27-1 or 27-2 in a cassette 26-1 or 26-2 is fed into the apparatus by a paper feeding roller 28-1 or 28-2 and is imparted rough timing by first register rollers 29-1 or 29-2 and imparted accurate timing by second register rollers 30, whereafter the transfer paper is transported toward the photosensitive drum.

Then, the toner image on the drum 11 is transferred therefrom onto the transfer paper 27 at it passes between an image transfer charger 31 and the drum 11.

After the image transfer has been completed, the transfer paper is guided onto a conveyor belt 8 and further directed toward a pair of fixing rollers 7-1 and 7-2, at which the transferred image on the transfer paper is fixed by pressing and heating, whereafter the transfer paper is discharged onto a tray 6.

On the other hand, after the image transfer, the drum 11 has its surface cleaned by a cleaning device 5 comprising an elastic blade and advances to another cycle of copying.

There are further seen an automatic original feeding device 40 (hereinafter referred to as AF) for feeding sheet-like originals to an exposure position, a sheet bucket portion 41 for containing the originals, a feeder portion 42 for separating the originals one from another and feeding the separated original, and a setter portion 43 for setting the original to an exposure surface 14.

Operation of the AF 40 shown in FIG. 1 will be described briefly.

Originals are contained into the bucket portion and the main switch of the copying apparatus is closed, whereafter a switch 92 in an AF operating portion to be described is depressed to turn on the lamp in the switch 92, whereupon the lowermost one of the originals placed in the bucket portion 41 of the AF is separated from the other originals by separating rollers 61 and brought to feed rollers 62.

The rollers 62 are operated for a time required for one sheet of original to be fed at predetermined timing, to thereby feed that original under a belt 63 moving around over the original platen 14. The original so fed under the belt 63 is transported until it reaches a pawl 46 which has been lowered at predetermined timing, and comes to halt thereat. The belt 63 is a little further moved around, and then stopped at predetermined timing. The belt 63 slides on the original until the belt 63 is stopped. Then, the lamp 16 and mirrors 15, 17 of the copying apparatus start their forward movement to scan the original and provide a copy on the transfer paper in the manner already described. When a number of copies set by a numeric key 87 to be described have been finished, a finish signal is supplied to the AF 40 to lift the pawl 46 and the belt 63 is again moved around to discharge the original from the platen 14. Simultaneously with this discharging operation, the rollers 61 and 62 are operated to feed the next original toward the belt 63. In this manner, copying is repeated with the originals interchanged one after another. Designated by 44, 45, 47 and 48 in the AF 40 are detectors for detecting the presence of an original. More specifically, 44 designates a detector for detecting whether or not originals are placed on the bucket portion 41, 45 denotes an oblique movement detecting photodetector for detecting whether or not an original has been straightly fed to the setter portion 43, 47 designates a detector for detecting an original at the exposure position, and 48 denotes a detector for detecting the discharge of the original. The detectors 44, 45, 47 and 48 are of the reflection type using a plurality of light-emitting diodes for a single light-receiving element, but they may also be of the transmission type. It is to be noted that the belt 63 is grounded to the apparatus body to remove any electrostatic charges developed and stored in the belt 63 by conveyance of the original.

The AF 40 is pivotally set from this side to the other side with respect to the copying apparatus so that it can be spaced apart with respect to the platen 14. A switch for automatically releasing the operation of the AF40 when the AF 40 has been spaced apart is provided on the AF 40. This prevents the AF 40 from being operated by mistake when the AF 40 is spaced apart from the platen 14.

Figure 2:
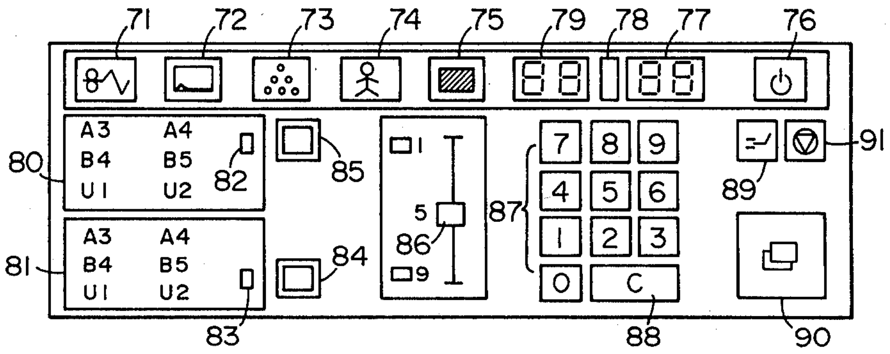
FIG. 2 is a plan view of the operating portion of the FIG. 1 apparatus.

FIG. 2 is a plan view of the operating portion of the FIG. 1 copying apparatus. The operating portion includes keys 84 and 85 for selecting the lower and upper cassettes, and a slide lever 86 for setting the copy density. The position 5 indicates the standard density. The operating portion further includes a numeric key 87 for setting the number of copies, a clear key 88 for cancelling the number set by the numeric key, a cut-in key 89 for executing another number of copies before the number of copies set by the key 87 is finished, a copy key 90 for instructing copy start, and a stop key 91 for stopping the copying operation during continuous production of the set number of copies. These keys use flat type touch sensors and are therefore very easy to operate. The copy key effects its switch operation for a pressure of $90\pm50$ g and the other keys effect their switch operation for a pressure of $120\pm50$ g, and these keys return to their initial positions when released from the pressure.

Designated by 71–76 are alarm displayers which all effect picture-word display. More specifically, the displayer 71 is paper feed check-up displayer which may be turned on when copy paper jams within the apparatus, when the original illuminating lamp is abnormally turned on or when a signal is not produced from a hole IC under the optical mirror rail. The displayer 72 is a paper/cassette supply displayer which may be turned on when no cassette is placed on the selected cassette table or when paper has become exhausted in the cassette set on that cassette table. The displayer 73 is a developer supply displayer which may be turned on when the developer in the devloping device is decreased below a predetermined amount. The displayer 74 is a serviceman call lamp which may be turned on when a trouble which cannot be recovered by the user occurs to the apparatus, thereby calling upon the user to call a serviceman. The displayer 75 is a key counter check-up displayer which may be turned on when a key counter is not inserted in the socket of the apparatus body. The displayer 76 is a weight/copy displayer (1) which may be turned on and off if the temperature of the fixing heater is lower than a predetermined valve when the main switch is closed and (2) which may be turned on from the time when the copy start key has been depressed until the exposure of the last copy is terminated, thus readily enabling the user to know the timing for interchanging the original. Designated by 77 is a copy number set displayer which, when a desired number of copies is set, displays that set number by seven segments. From 1 to 99 sheets can be set at a time. In 30 seconds after completion of the copying, or when the clear key is depressed, the set number is automatically returned to 01. Denoted by 79 is a copy number displayer which, when copying operation is started, displays count for each copy until the number of copies produced becomes coincident with the set number.

Designated by 78 is a cut-in displayer which may be turned on when the cut-in key is depressed and may be turned off after the cut-in copying has been terminated. Denoted by 80 and 81 are upper and lower cassette size displayers which display the sizes of the upper and lower cassettes set. The sizes of the upper and lower cassettes can be known from this display at a time. Denoted by 82 and 83 are displayers which display the cassette stages to which an input has been applied by keys 85 and 84.

Figure 3:
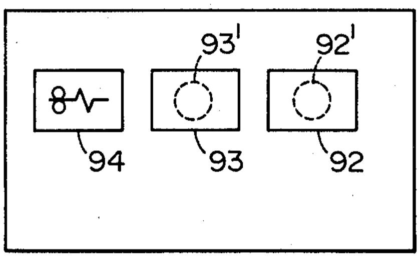
FIG. 3 is a plan view of the operating portion of an automatic original feeding device.

FIG. 3 is a plan view of the operating portion of the AF provided on the front face of the AF 40. Designated by 92 in FIG. 3 is a self-lighting switch. If this switch 92 is depressed when the apparatus body and the AF are in usable conditions, the lamp 92′ within the switch 92 is turned on but this lamp is not turned on at the other time even if the switch is depressed. If the AF 40 is not conveying an original during the turn-on of the lamp 92′, the lamp 92 will be turned off when the switch 92 is depressed, but when the AF 40 is coveying an original, the lamp 92′ will not be turned off even if the switch 92 is depressed. Designated by 93 is a self-lighting stop button for effecting emergency stop when the AF 40 is conveying an original. The stop button 93 has therein a lamp 93′ for displaying that a stop signal has been applied. The keys 92 and 93 may be replaced by a single common key. Denoted by 94 is a conveyance abnormality display lamp which may be turned on when abnormality such as jam or the like occurs during conveyance of an original.

Operation of the AF 40 will be described in detail by reference to FIG. 1. A signal indicating whether or not the apparatus body can carry out copying operation is applied from the apparatus body to the AF 40. When the apparatus body can carry out copying operation and the AF 40 is in a predetermined condition, namely, a condition in which it can feed an original, the aforementioned switch 92 is in ready-to-receive condition and by depressing the switch 92, the lamp 92′ in the switch 92 is turned on which indicates that the AF 40 is in its usable condition.

Where the main switch of the copying apparatus body is not closed when the switch 92 is depressed, or where no paper is present in the designated cassette, or where the copying apparatus body is not in ready-to-copy condition due to jam or the like at initial stage, the lamp 92′ is not turned on however often the switch 92 is depressed, and the condition in which the AF 40 can function, namely, the ready-to-use condition of the AF, is not brought about. Also, where the original placed on the setter portion 43 is deviated from the exposure surface, or where the original cannot be properly conveyed when the AF 40 has started to be driven, the above-mentioned ready-to-use condition of the AF is not brought about and the lamp in the switch 92 is not turned on. Also, when the conveyance abnormality display lamp 94 is turned on in the AF 40, the above-mentioned ready-to-use condition of the AF is not brought about. By this, the user can quickly become aware of the absence of paper in the cassette from the turn-off of the lamp 92′. That is, the switch 92 becomes ready-to-receive condition with the lamp 92′ turned on when the AF 40 is in ready-to-use condition and the apparatus body is in usable condition.

Exceptionally, during the time from the closing of the main switch of the apparatus body which is necessary for heating of the fixing device till the stand-by of the apparatus body, the switch 92 is in ready-to-receive condition with the lamp 92′ turned on and when originals are set in the bucket portion, the AF 40 is started simultaneously with the stand-by of the apparatus body, thereby effecting the copying operation. In the copying apparatus of the present embodiment, when copying is started after the AF 40 has been set to its ready-to-use condition, if originals are present in the bucket portion 41, an original is fed to the exposure position to effect copying and if an original is present at the exposure position on the original platen 14, a copy is produced for the original on the platen. That is, irrespective of the set position of the original, a conditon matching the respective operation is brought about after the set position has been confirmed. For example, where an original is set on the exposure surface 14 and no original is set in the sheet bucket portion 41, the original on the exposure surface is detected by detector 47 so that copying operation is effected for the original on the exposure surface and upon termination of the copying operation, the original is discharged. In that case, if originals are set in the sheet bucket portion 41, an original is fed from the sheet bucket portion 41 to the setter portion 43 simultaneously with the discharge of the copied original after the termination of the copying operation.

That is, where an original has already been set to the exposure position when copy start has been instructed, the presence of the original is detected by detector means to start copying operation and after a predetermined number of copies have been produced, the original set to the exposure position is discharged by the original feeding means AF.

With such a construction, copying is possible both when an original is placed in the bucket portion in which originals are stored and when an original is placed at the exposure position and therefore, the apparatus is easy to use even for users unaccustomed to the feeding means AF 40.

When an original is set not at the exposure position but only in the sheet bucket portion 41, the original is immediately fed to the exposure position. Further, when the original is set at the exposure position, copying operation is effected and as soon as the copying operation is terminated, the original is discharged and a new original is fed to the exposure position. Such operation is repeated until the originals in the sheet bucket portion 41 become exhausted.

Also, where any original is set neither at the exposure position nor in the sheet bucket portion 41 when the lamp 92′ is turned on at the initial stage, a first predetermined timer for counting a first time from the depression of the switch 92 is operated and the lamp in the switch 92 continues to be turned on during that time, and when originals are set in the sheet bucket portion 41 before said first pre-determined time has elapsed, the first timer is released and a set timer for counting a second predetermined time is newly operated. Only when the set timer is released, the rollers 61, 62 and 63 of the AF 40 start to move and when copying operation for all the set orginals has been terminated, the first timer again starts time-counting.

Also, if the originals are taken out of the bucket portion 41 before the set timer completes counting of the second predetermined time, the set timer is released and the first timer again starts time-counting.

If no original is set in the bucket portion 41 within said first predetermined time, the lamp in the switch 92 is turned off and the usable condition of the AF 40 is released. Also, even when the setter portion 43 is spaced apart from the platen 14 with the turn-on of the lamp in the switch 92 being forgotten, the lamp in the switch 92 is turned off and the rollers 61, 62 and the belt 63 are not operated.

That is, even if the lamp in the switch 92 is turned on and the AF 40 is put into usable condition wherein feeding is effected when originals have been set in the bucket portion 41, the lamp in the switch 92 is automatically turned off unless originals are set and this leads not only to reduced power consumption but also to elimination of malfunctioning which would otherwise occur when the next user places originals in the bucket portion 41 by mistake, thus preventing the originals from being damaged.

Further, feeding can be effected at any time during the first predetermined time and therefore, it is not necessary to set all originals in the bucket portion 41 as a paper feeding portion in which originals are stored before the copy start instruction is executed.

Also, after originals have been set, the set timer becomes operative and the rollers 61, 62 and the belt 63 are not driven during the second predetermined time (about 2 to about 4 seconds) and therefore, there is a time for re-setting originals if the originals are obliquely set, and this prevents occurrence of abnormal conveyance of originals and eliminates the possibility of the originals being damaged.

Also, since the usable condition of the AF 40 is released after the first predetermined time (about 20 seconds to about one minute) has elapsed after completion of all the copying operation by the AF 40, there is no possibility of giving trouble to the next user who may want to copy a thick original in a usual manner.

If abnormal conveyance of an original occurs when the rollers 61, 62 and belt 63 of the AF 40 are being driven, all of these rollers 61, 62 and belt 63 are stopped to protect the original and the aforementioned display lamp 94 is turned on. At this time, the lamp 92′ in the switch 92 continues to be turned on and the AF 40 maintains its usable condition. Even if the setter portion 43 is spaced apart from the platen 14 at such time in order to eliminate the abnormal conveyance, the lamp in the switch 92 continues to be turned on. Therefore, when the original being abnormally conveyed is re-set and a reset button provided within the AF 40 is depressed to eliminate the abnormal conveyance and thereafter the display lamp 94 is turned off and the setter portion 43 is returned to its predetermined position, then the rollers 61, 62 and belt 63 are again driven without the switch 92 being depressed, thus resuming the operation of the AF 40. In this case, the set position of the original after the abnormal conveyance may be either at the exposure position on the platen 14 or in the aucket portion 41. Further, even when jam or absence of paper in the cassette occurs in the apparatus body during the turn on of the lamp in the switch 92 of the AF 40 to make the copying operation impossible, the usable condition of the AF 40 is maintained unless the switch 92 is depressed, whereby the copying operation of the apparatus body becomes possible and the AF 40 starts to operate.

When stop key 91 on the operating portion of the copying apparatus body is depressed, the body side is stopped after a copy formed when the stop key 91 has been depressed is discharged, while the AF 40 side discharges only the original lying at the exposure position on the platen 14 when the stop key 91 has been depressed, and does not convey the original lying in the bucket portion 41. Also, where both the discharging operation and the paper feeding operation are taking place when the stop key 91 has been depressed, even the original being fed is discharged without being copied. When the original at the exposure position is discharged, the lamp in the switch 92 is turned off to release the usable condition of the AF 40.

That is, the copying apparatus of the present embodiment has the AF 40 as the feeding means for feeding originals to the exposure position, the apparatus body as the image formation means for forming copy images, and the stop key 91 on the body side as the instruction means for instructing interruption of the operation during the operation of said image formation means, and discharges the original lying at the exposure position in accordance with the instruction from said instruction means, and it is very simple and expedient in that the user can discharge the orginal lying at the exposure position simply by instructing interruption of the image formation.

As described above, the lamp 92′ in the switch 92 is turned on during the usable condition of the AF 40 and during the use of the AF 40, and the turn-on of such lamp means that the AF 40 is in a position capable of feeding, that the copying apparatus body and the AF 40 becomes operable and that the AF 40 will feed an original if originals are set. Accordingly, if any abnormality should occur when the lamp in the switch 92 is turned on, the AF 40 will resume its operation if only the abnormality is eliminated and therefore, the user need not carry out any extra operation such as re-depressing the copy button or re-closing the main switch of the AF.

When the stop button 93 on the AF 40 side is depressed, lamp 93′ is turned on and the rollers 61, 62 and belt 63, when driven, are all stopped and the lamp 92′ is turned off to display the application of a stop signal and the AF usable condition is reset.

In the present embodiment, there is a motor for driving the setter portion belt 63 and a motor for driving the feeder portion rollers 61, 62, whereas it is also possible to employ a single drive source by changing over it by a clutch or like means.

Figure 4:
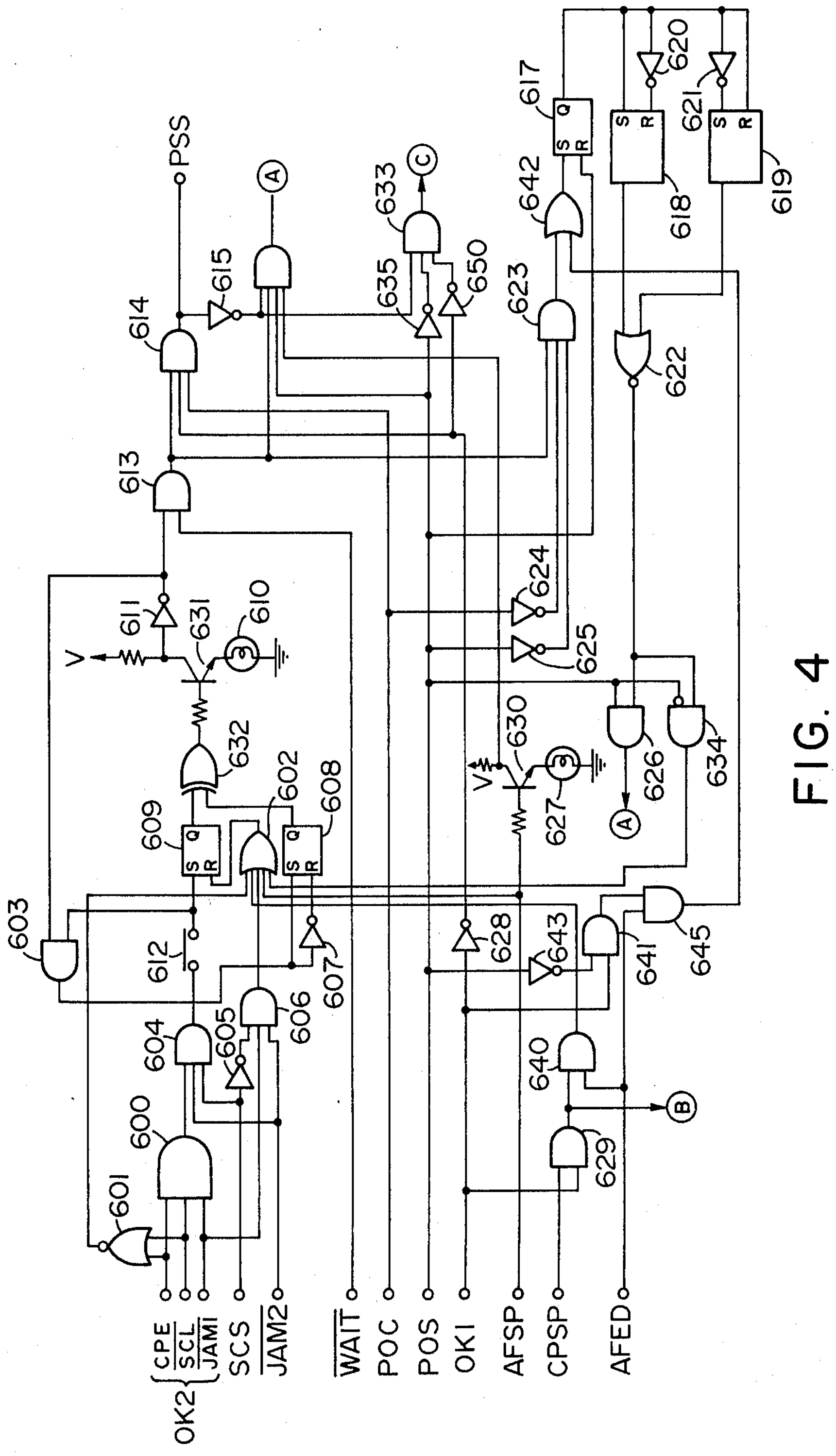

FIGS. 4 and 5 show the circuits in the copying apparatus having the function as described above.

In these Figures, OPE is cassette paper existence signal indicative of the presence of paper in the cassette, $\overline{SCL}$ is serviceman call lamp non-turn-on signal, $\overline{JAMI}$ is no-jam-in-body signal, SCB is a signal indicative of the setter portion 43 being positioned on the platen 14, $\overline{\text{JAM2}}$ is no-jam-in-AF 40 signal, $\overline{\text{WAIT}}$ is wait lamp 76 turn-off signal indicative of the preparation in the body having been completed, POC is detection signal of the original at the exposure position on the platen 14, POS is detection signal of the original in the bucket portion 41, OKI is copy end signal indicative of a predetermined number of copies having been completed for an original, AFSP is AF stop signal put out when the stop key 93 of the operating portion of the AF 40 is depressed, CPSP is body stop signal put out when the stop key 91 of the body is depressed, AFED is original discharge confirmation signal put out when an original is discharged from the setter portion 43, FM is feeder portion drive signal for driving the rollers 61, 62 of the feeder portion 42 of the AF 40, SM is setter portion drive signal for driving the belt 63 on the setter portion 43 side, PSP is plunger drive signal for driving a plunger to remove the original stopping pawl 46 from the conveyance path, PSS is copy start signal for stopping the roller 63 and starting the copying, and AFOK is detection signal indicative of the condition in which the detector 45 for detecting oblique light is detecting the light from the optical system of the original exposure lamp 16.

When the signals CPE, $\overline{\text{SCL}}$ and $\overline{\text{JAM1}}$ are all at a high level (hereinafter referred to as "H"), the output of an AND gate 600 becomes "H". That is, when there is no abnormality on the body side, the output of the AND gate 600 becomes "H". Further, when the signals SCS and $\overline{\text{JAM2}}$ both are "H", the output of an AND gate 604 becomes "H", thus indicating that there is no abnormality either in the AF or the body. Designated by 612 is the aforementioned switch 92 which is connected only when it is depressed. If the switch 612 is depressed when there is no abnormality either in the body or the AF, RS flip-flop (hereinafter referred to as FF) 609 becomes set. On the other hand, FF 608 is not set at this point of time and therefore, its output is at low level (hereinafter referred to as "L"), so that the output of an exclusive OR gate 632 becomes "H" to turn on a transistor 631 and turn on a lamp 610. The lamp 610 is the lamp 92' (FIG. 3) in the switch 92.

When the switch 612 is further depressed at this time, both inputs of AND gate 603 become "H" by the output of an inverter 611, so that FF 608 is set and the output thereof becomes "H" and therefore, the output of the gate 609 becomes "L" to turn off the lamp 610. Further, when CPE becomes "L" with the paper in the cassette becoming exhausted during the turn-on of the lamp 610, or when SCL becomes "L" with the serviceman call lamp being turned on, or when $\overline{\text{SCS}}$ becomes "L" with the setter portion 43 being spaced apart from the platen 14, FF 609 is reset so that the output of the gate 632 becomes "L" to turn off the lamp 610.

When the lamp 610 is turned on, the output of the inverter 611 is "H" and if the signal $\overline{\text{WAIT}}$ from the body is "L", the output of the AND gate 613 is "L", and if the signal $\overline{\text{WAIT}}$ becomes "H", the output of the gate 613 becomes "H". If, at this point of time, an original is set to the exposure position (POC is "H") and the copy end signal OKI is "L", the output of AND gate 614 becomes "H" and the copying operation of the body is started by the signal PSS. When, during the turn-on of the lamp 610, the signal OKI is "H" or no original is present at the exposure position (POC is "L") and paper is present in the feeder portion (POS is "H"), the output of AND gate 616 becomes "H" and (A) becomes "H", so that, as shown in FIG. 5, the signal SM becomes "H" to drive the setter portion roller 63 while, at the same time, the signal PSP becomes "H" so that the pawl 46 on the conveyance path is removed. The pawl 46 is returned onto the conveyance path after the original at the exposure position has been discharged.

When, at this time, no original is present at the exposure position (POC is "L"), the optical system is not being driven and therefore, the signal FM also becomes "H" and the setter portion belt 63 and the feeder portion rollers 61, 62 are driven substantially simultaneously. However when the last exposure has been completed for the original at the exposure position (namely, when OKI has become "H"), the detector 45 of FIG. 1 for detecting oblique movement of an original detects the afterglow after the original exposure lamp 16 has been turned off with the optical system thereof reversed and renders the signal AFOK to "L", thus inhibiting the feeder portion rollers 61, 62 from being driven during the detection of the afterglow. The reversal position of the optical system differs depending on the size of the original and therefore, as the size of the original is larger, the time during which AFOK is "L" from the time of reversal (the time when OKI has become "H") is longer to thereby enable the next original to be fed at a sufficient time interval with respect to the exposed original and thus prevent the next original from being set before the exposed original is completely discharged, which in turn leads to prevention of occurrence of jam and minimization of the interval between the originals as well as increased copying speed.

Next, where no paper is present in the feeder portion 42 (POS is "L") when the signal OKI has become "H", the output of AND gate 633 becomes "H" and (C) becomes "H".

When, as shown in FIG. 6, (C) becomes "H", SM becomes "H" and FM becomes "L", so that the setter portion rollers 61, 62 are driven to effect the discharge of the original at the exposure position.

Also, if no original is present either at the exposure position or in the feeder portion when the lamp 610 is turned on, the output of AND gate 623 becomes "H" to set FF 617 and set the first timer 618, which thus counts the said first predetermined time. When paper is set in the feeder portion during the counting of the first timer 618, both FF 617 and the first timer 618 are reset and a timer 619 which is said set timer is set. When the output of the set timer 619 becomes "L" after said second predetermined time has been counted, the output of NOR gate 622 becomes "H" because the output of the timer 618 is also "L" and at this time, originals are set in the feeder portion 43, so that the output of AND gate 626 becomes "H" and the (A) terminal becomes "H" while both FM and SM become "H", thus driving the rollers of the AF 40.

When the first timer 618 completes its time count, the output of this timer 618 becomes "L" and since the output of the set timer 619 is also "L" at this time, the output of NOR gate 622 becomes "H", but since the signal POS is "L", the output of AND gate 626 becomes "L" and the rollers of the AF 40 are not driven. At this time, the output of AND gate 634 becomes "H" to reset the FF 609 and turn off the lamp 610.

When originals are taken from the feeder portion 42 after the set timer 619 has been set and before the second predetermined time elapses, the FF 617 is again set so that the first timer 618 is set and the second timer is reset to effect counting of the first predetermined time again.

When copying of all the originals set in the feeder portion 42 has been completed and the last original has been discharged, the signal POS becomes "L" and the signals OKI and AFED become "H", so that the output of AND gate 645 becomes "H" to set the first timer again, which thus effects the counting of the first predetermined time.

Also, when the body side copy stop signal CPSP is put out during the copying, the output of AND gate 629 becomes "H" and the terminal (B) becomes "H" when the signal OKI indicative of the reversal of the optical system has become "H", so that only the setter side belt 63 is moved around to discharge the original in the setter portion, whereupon the signal AFED becomes "H" and the output of AND gate 640 becomes "H", so that the lamp 610 is turned off and the setter side belt 63 is stopped.

If the AF side stop button 93 is depressed when FM or SM is "H", AFSP becomes "H" and the lamp 610 is turned off while the lamp 627 in the AF side stop button 93 is turned on and all the rollers are stopped from being driven.

Figure 7:
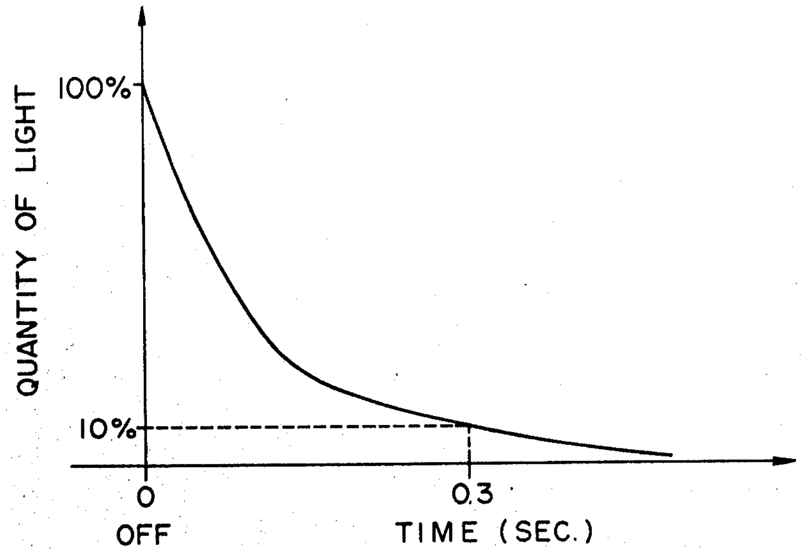
FIG. 7 is a graph illustrating the afterglow characteristic of an original illuminating lamp.

The operation timing of the setter side belt 63 and the feeder side rollers 61, 62 by size of originals will now be described with reference to the time chart of FIG. 6 and FIG. 7 which shows the afterglow characteristic of the halogen lamp for illuminating the original.

When an A4 size original is illuminated and scanned, the optical system on signal EXP becomes "L" at a time point $t_1$ as shown in (A) and the original exposure lamp is turned off. At this time, as shown in the lamp afterglow characteristic graph of FIG. 7, light remains for the order of 0.3 second, but since the reversal position of the optical system which reciprocally scans is substantially near the center of the platen 14, the afterglow is not detected by the detector 45. Accordingly, the signal AFOK is not put out but both SM and FM are put out to operate the setter side belt 63 and the feeder side rollers 61, 62 simultaneously and thereby interchange the original.

When a B4 size original is illuminated and scanned, as shown in (B), the optical system on signal EXP becomes "L" at a time point $t_2$ and the original exposure lamp is turned off, but in the case of B4, the reversal position of the optical system is considerably near the detector 45 and therefore, the afterglow is detected. During the detection of the afterglow, the signal AFOK is "H", so that the feeder side rollers 61, 62 are not driven during that time but are driven only when AFOK becomes "L".

When an A3 size original is illuminated and scanned, the feeder side rollers 61, 62 are likewise driven with a certain degree of delay with respect to the setter side belt 63 and therefore, before the previous original is completely discharged, the next original is not set and the setter side belt 63 is not stopped.

As described above, the copying apparatus of the present embodiment has feed means for feeding a plurality of originals one by one, light scanning means reciprocally movable to illuminate the original at the exposure position, and photodetector means for detecting the light from said light scanning means and after said original has been scanned, said photo detector means inhibits the feeding of the next original by the output thereof, so that it is possible to change the feeding interval between the exposed original and the next original in accordance with the scanning distance and thus, to prevent occurrence of jam. Moreover, the possibility of setting the interval between the originals to a necessary minimum limit by the position of the photodetector means leads to increased copying speed. Further, the use of light scanning means to take the timing of original feeding eliminates the necessity of newly using a timer or the like.

Still further, the present embodiment uses the detector 45 for detecting oblique movement of originals and this eliminates the necessity of newly providing a photodetector, which in turn leads to reduced cost of the apparatus.

Figure 8:
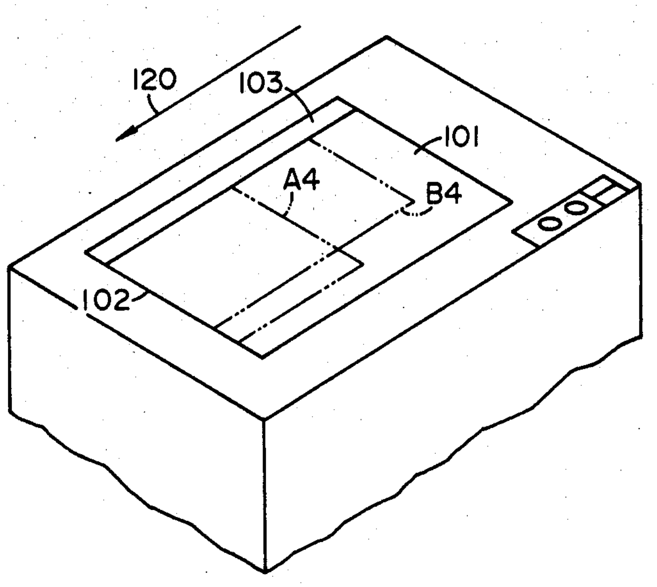
FIG. 8 is a perspective view showing the exposure area and the original positioning portion on the original supporting surface.

Description will now be made of the original positioning device in the present embodiment. FIG. 8 is a perspective view of the copying apparatus exemplarily showing the positioning when an original is placed on an original supporting surface 101. On the original supporting surface 101, exposure areas for respective original sizes (for example, A4 and B4) are determined and positioning of an original is accomplished by causing the original to bear against the end 102, and the positioning end 103 of the original supporting surface 101 so that the original may not be deviated with respect to the exposure area.

Figure 9:
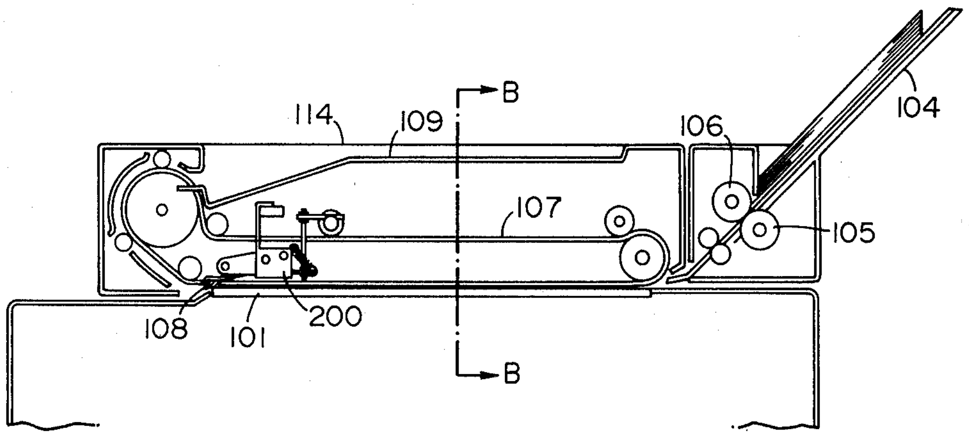
FIG. 9 is a cross-sectional view showing an example of the automatic original feeding device.

FIG. 9 is a cross-sectional view of the automatic original feeding device which automatically conveys a plurality of sheet originals. In FIG. 9, sheet originals are separated one by one from the original carrying bed 104, on which are carried the sheet originals, by separating and conveyor rollers 105, 106, and the sheet original so separated is conveyed to the exposure area by and between a conveyor belt 107 and the original supporting surface 101, and temporally comes to a halt at the exposure area by the leading end of the sheet original striking against a stop hawl 108. After the exposure has been completed, the stop pawl 108 is upwardly released and the conveyor belt 107 is again moved around to discharge the sheet original into a tray 109.

This automatic original feeding device is constructed so that it can be upwardly opened on the original supporting surface 101 to permit a thick original such as a book or the like to be placed on the original supporting surface 101 and exposed to light.

Figure 10:
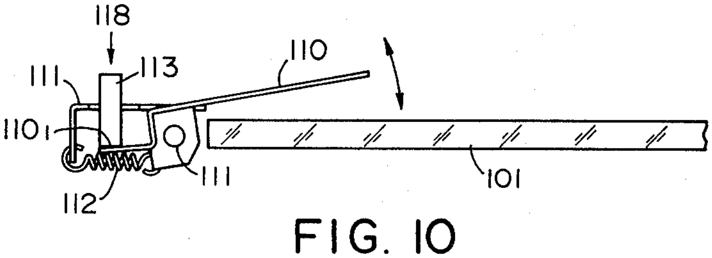
FIG. 10 is a fragmentary cross-sectional view showing the essential portions of the original positioning device of the present invention.
Figure 11:
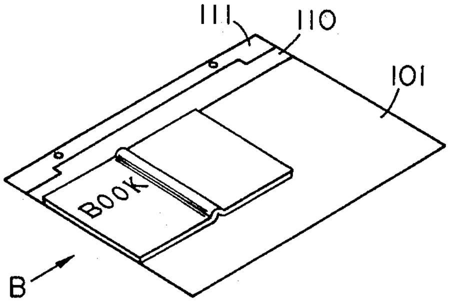
FIG. 11 is a perspective view showing the operating condition, when necessary, of the original positioning device.

Referring to FIG. 10, it is a fragmentary enlarged cross-sectional view showing the essential portions of the original positioning device in the present embodiment. A positioning plate 103 is divided into a movable positioning member 110 and a stationary positioning member 111. The movable positioning member 110 is pivotable about a shaft 111 and movable between a first position in which it contacts or approaches the original supporting surface 101 and a second position in which it is retracted from the original supporting surface 101. A tension spring 112 is secured to a part of the movable positioning member 110 and a part of the stationary positioning member 111, and the movable positioning member 110 is biased for rotation in the clockwise direction as indicated by arrow. Accordingly, the movable positioning member 110 is usually urged against the original supporting surface 101 by the resilient force of the spring 112 so as to act as an ordinary original positioning plate, and it facilitates the positioning of a thick original when installed on the original supporting surface 101 by raising the sheet original feeding device. FIG. 11 is a perspective view of the original supporting surface showing the condition in which a thick original such as a book or the like is placed thereon.

At the end $110_1$ of the movable positioning member 110 which is opposite to the original supporting surface 101, a pin 113 vertically movable in response to the opening-closing of the automatic original feeding device is provided through a hole formed in the stationary positioning member 111 and, when this pin 113 is depressed downwardly as viewed in the Figure, the movable positioning member 110 is pivoted counter-clockwisely, as viewed in the Figure, to a second position in which it is retracted from the original supporting surface 101. Accordingly, even if a sheet original is conveyed in this condition, the movable positioning member 110 forms no obstacle against the sheet original since it is spaced apart from the original supporting supporting surface 101.

Figure 12:
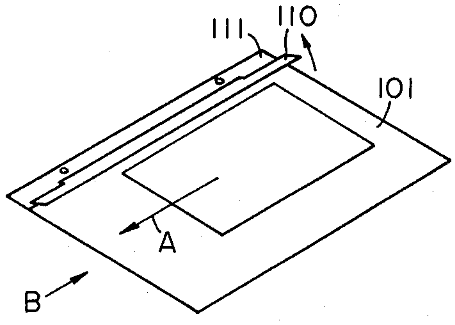
FIG. 12 is a perspective view showing the operating condition, when unnecessary, of the original positioning device.

FIG. 12 is a perspective view of the original supporting surface showing such condition. FIG. 10 is an enlarged view showing the essential portions in such condition.

Figure 14:
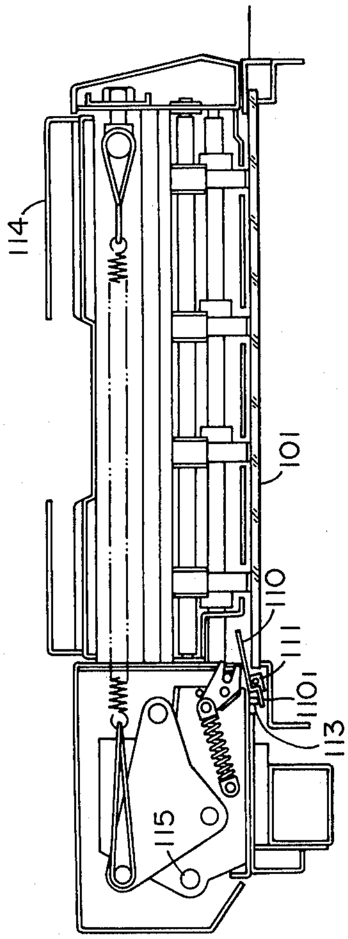
FIG. 14 is a cross-sectional view taken along line B—B of FIG. 9 and showing the operational relation when the automatic original feeding device is downwardly closed.
Figure 13:
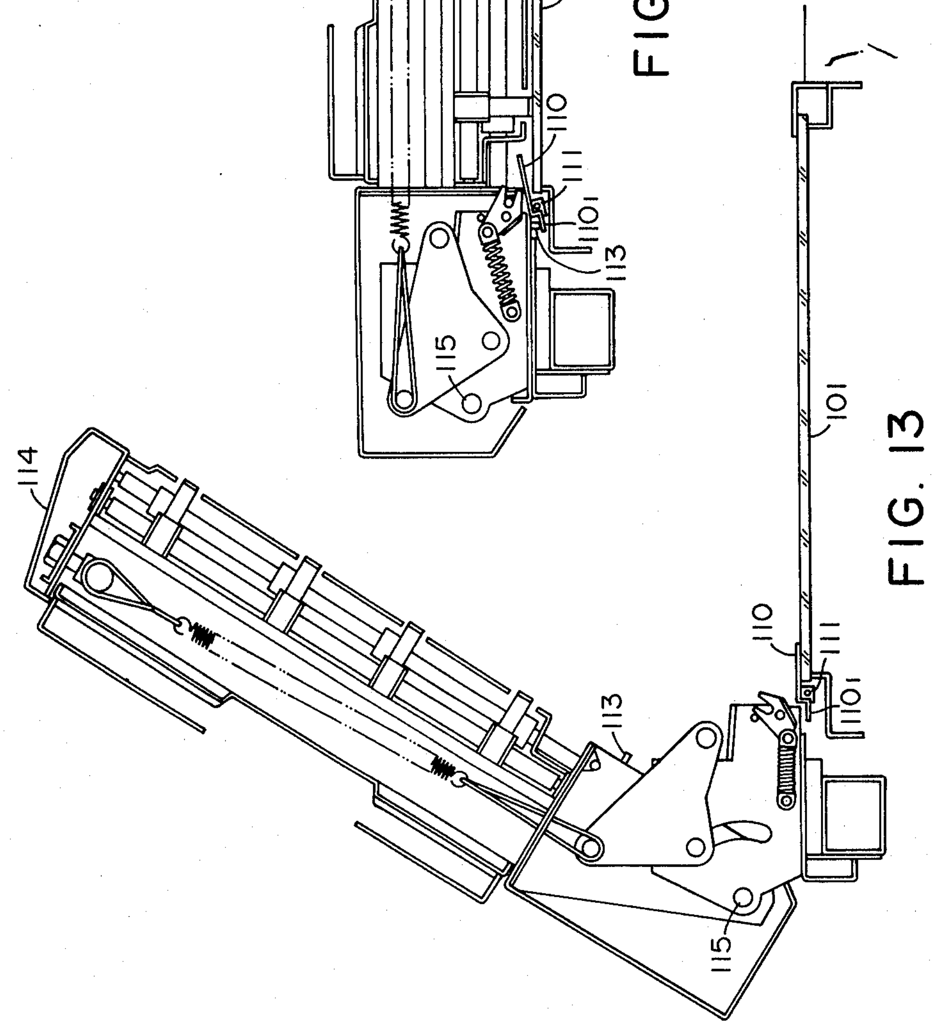
FIG. 13 is a cross-sectional view taken along line B—B of FIG. 9 and showing the operational relation with the original positioning device when the automatic original feeding device is upwardly opened.
Figure 15A:
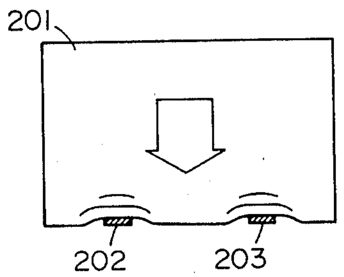
FIGS. 15(*a*) and 15(*b*) are plan views of the original stopping portion showing the stoppage of the original.
Figure 15B:
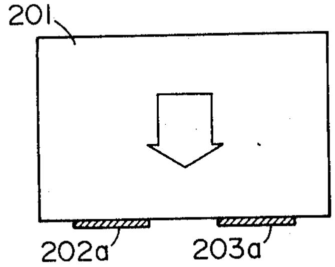
Figure 16A:
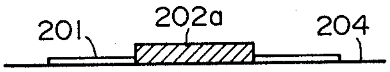
FIGS. 16(*a*) and 16(*b*) are front views of the same portion.
Figure 16B:
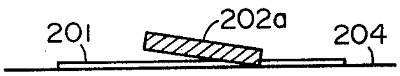

Reference is now had to FIGS. 13 and 14 to describe the operative association between the original positioning member 110 and the automatic original feeding device 114. In FIG. 13, the pin 113 acting on one end portion of the movable positioning member 110 is retracted from the end $110_1$ of the movable positioning member 110 in response to the upward retraction, namely, counter-clockwise rotation, of the automatic original feeding device 114 about a shaft 115 and therefore, the movable positioning member 110 is urged against the original supporting surface 101 by a spring 112. Accordingly, the movable positioning member 110 can act as one for thick original.

In FIG. 14, the end $110_1$ of the movable positioning member 110 has been clockwisely pivoted about the shaft 115 in response to the installment of the automatic original feeding device 114 onto the original supporting surface and is depressed by the pin 113 and therefore, the movable positioning member 110 is maintained in retracted condition with respect to the original supporting surface 101.

Since the present embodiment is of the above-described construction, the positioning of an original is effected only when necessary, for example, when a thick original is to be copied and the automatic original feeding device has been retracted so as not to be used, and the positioning action is released when the positioning is unnecessary, for example, when sheet originals are conveyed by the automatic original feeding device, whereby the original positioning device forms no obstacle against the conveyance of sheet originals when the positioning action is unnecessary, thus ensuring the stability and safety with which sheet originals are conveyed.

Figure 17:
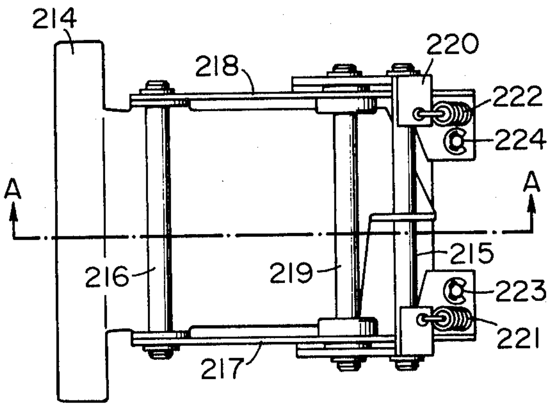
FIG. 17 is a plan view of the stop portion.
Figure 18:
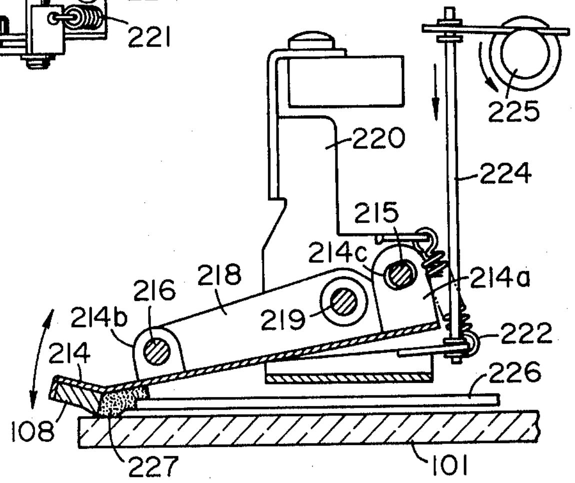
FIG. 18 is a cross-sectional view of the same stop portion taken along line A—A of FIG. 17.

Description will now be made of the stop mechanism portion 200 of the stop pawl 108 shown in FIG. 9. A plan view of the stop mechanism portion 200 is shown in FIG. 17, and a cross-sectional view thereof taken along line A—A of FIG. 17 is shown in FIG. 18.

In these Figures, the stop pawl 108 is adhesively secured to the back side of the bent portion of the fore end of a bracket 214. On the other hand, at the other end of the bracket 214, a first shaft 215 extends through a bent portion 214*a* and is secured to a hanger 220 which in turn is secured to the apparatus body. With such construction, the bracket 214 is rotatable about the shaft 215. A second shaft 216 extends through a bent portion 214*b* adjacent to the fore end of the bracket 214. This shaft 216 is rotatably mounted on arms 217 and 218 which in turn are mounted on the fixed hanger 220 by means of a third shaft 219. That is, the shaft 216 is rotatable relative to the bent portion 214*b* and arms 217, 218 of the bracket, and the third shaft 219 mounts thereon the arms 217 and 218 for rotation relative to the hanger 220. The arms 217 and 218 are mounted to the hanger 220 so that they can operate independently of each other. The arms 217 and 218 have springs 221 and 222 between themselves and the hanger 220 at the rear end of the bracket 214, and the bracket 214 is biased for counter-clockwise rotation by these springs.

With the above-described construction, the arms 217 and 218 control the back and forth, leftward and rightward, and upward and downward movements of the bracket 214 and cooperate with the first shaft 215 and the second shaft 216 to control the rotation of the bracket 214 about the second shaft 216, so that by rotating the arms 217 and 218 about the third shaft 219, the fore end of the bracket 214 may be moved up and down as indicated by double-headed arrow. The hole 214*c* in the bent portion 214*a* of the bracket 214 through which the first shaft 215 extends is selected to a diameter somewhat larger than the diameter of the shaft 215, and the holes provided in the arms 217 and 218 through which the second shaft 216 extends are likewise selected to a diameter somewhat larger than the diameter of the shaft 216. By making the diameters of the respective holes larger than the diameters of the associated shafts, the bracket 214 can have a certain degree of feedom in substantially parallel relationship with the third shaft 219 and the first shaft 215.

The arms 217 and 218 are biased by the springs 221 and 222 so that they are independently rotated counter-clockwisely about the shaft 219, whereby the pawl 108 of the bracket 214 can be freely inclined with respect to the platen surface, so that the entire side of the pawl 108 can be sufficiently urged against the platen surface 101 and therefore, the pawl 108 can automatically intimately contact the platen surface even if the shafts 215 and 219 are not accurately parallel to the platen surface.

To lift the stop pawl 108, rotational force opposite in direction to the forces of the spring 221 and 222 may be imparted to the arms 217 and 218. In the present embodiment, the pawl 108 may be lifted from the platen surface by counter-clockwisely rotating a shaft 225 rotatable in the direction of arrow by the drive of a plunger, not shown, depressing a rod 224 in the direction of arrow and thereby clockwisely rotating the arms 217 and 218.

Incidentally, the lift of the bracket 214 is controlled by the signal PSP which drives the plunger. Also, in the aforementioned embodiment, the shaft 215 may be eliminated and the bracket 214 may be rotated about the shaft 219 and moreover, the bracket may be urged at one point, instead of two points, on the platen surface.

With the aforementioned construction, the stop pawl can be brought into uniformly intimate contact with the platen surface to thereby prevent an obliquely conveyed original from being bitten into one end of the stop pawl.

Next, if four conveyor belts each having a width of 10 mm are used in a system wherein JIS A3 sheets are lengthwisely conveyed and the conveyance velocity is set to 500 mm/sec., it has been empirically found that the conveyance force is about 20 g and the impact force with which the original strikes against the stop pawl is about 5 g. Accordingly, if the self-support strength of the original exceeds the sum of the conveyance force and the impact force, namely, about 25 g, then the original is not deformed or damaged by bearing agaist the stop pawl, but if the original is 30 g/m$^2$ or less in weight, occurrence of deformation or damage of the original cannot be prevented. Since there can be expected no original having no strain or warp, the original is deformed or damaged beyond the limit of deformation determined by the self-support strength of the original. To prevent this, a guide plate 226 as shown in FIG. 18 may be provided on the back side of the belt 107 shown in FIG. 9, thereby preventing floating up of the original. This guide plate 226 may also act as a countermeasure for preventing the back side of the original from being copied, if that side of the guide plate which is opposed to the original is made white.

Incidentally, in the original feeding device of the stationary exposure type like the present embodiment, if the device is of the other type than that in which the conveyor belt 107 has a width equal to or greater than the width of the original, it is difficult to manufacture such device without providing for some clearance between the stop pawl 108 and the white guide plate 226, and if one dares to manufacture such device without providing for such a clearance, it will lead to increased cost. Therefore, according to the present invention, a shock absorbing member 227 having a suitably high friction coefficient such as white Moltprene or the like is used between the stop pawl 108 and the white guide plate 276, whereby it has become possible to eliminate said clearance and, at the same time, to prevent bulging of the original. If the pawl is of the type which lowers from above, the shock absorbing member 227 may preferably be provided adjuacent to the pawl as in the present embodiment, and if the pawl is of the type which acts from below, the shock absorbing member may preferably be provided adjacent to the guide plate to decelerate the original.

It has already been described that according to the result of the experiment, the force with which the original strikes against the stop pawl is about 25 g, but this refers to the case that the original is strong and actually, it has been found that such force is about 20 g. With such data as the basis, the previously mentioned shock absorbing member 227 is used as the brake means for the conveyed original and consumes about 10 g, whereby a good result may be obtained as the stoppage effect of the original.

By so providing the shock absorbing member on the front stage of the stop pawl, it is possible to suitably attenuate the conveyance force of the original and prevent the original from abruptly striking against the pawl and thus prevent the original from being damaged or deformed by the stop pawl. By providing such a shock absorbing member on the stop pawl which can uniformly contact the platen surface, the effect of original protection may be further enhanced.

As has been described hitherto, the copying apparatus provided with the automatic original feeding device of the present invention has various effects. Also, the present invention is not restricted to the illustrated embodiment but it includes various applications and modifications.

What we claim is:

1. A copying apparatus comprising:

(a) original feeding means for feeding an original document to an exposure position, and for discharging the original document from the exposure position after exposure;

(b) image formation means for forming an image corresponding to the image of said original document;

(c) start instruction means for initiating operation of said original feeding means;

(d) detector means for detecting the presence of the original document at said exposure position; and (e) control means responsive to an output of said detector means, when said original feeding means is operating in response to said instruction means, for controlling said image formation means to produce a predetermined number of copies of said original document and for controlling said original feeding means to discharge the original document upon completion of said copies.

2. A copying apparatus according to claim 1, wherein said original feeding means has a container portion for containing unexposed sheet-like originals therein.

3. A copying apparatus according to claim 2, wherein said control means controls said original feeding means when copy start has been instructed so that the originals are fed from said container portion to said exposure position when originals are present in said container portion and there is no output of said detector means.

4. A copying apparatus according to claim 1, wherein said start instruction means is provided on said original feeding means.

5. A copying apparatus according to claim 1, wherein said image formation means has signal generating means for generating an image formation possibility signal indicative of the fact that image formation is possible.

6. A copying apparatus according to claim 5, wherein said control means inhibits the instruction from said start instruction means when said image formation possibility signal is not being generated.

7. A copying apparatus according to claim 1, wherein said original feeding means has means for generating a feeding possibility signal inducative of the fact that feeding of the original is possible.

8. A copying apparatus according to claim 7, wherein said control means inhibits the instruction from said start instruction means when said feeding possibility signal is not being generated.

9. A copying apparatus comprising:

(a) original feeding means for feeding an original document to an exposure position and discharging the original document after exposure;

(b) image formation means for forming a copy image of the original document;

(c) stop instruction means for instructing interruption of multiple copy operations during the operation of said image formation means; and (d) control means responsive to said stop instruction means for controlling said original feeding means to discharge the original from the exposure position.

10. A copying apparatus according to claim 9, wherein said original feeding means has a container portion for containing a plurality of unexposed sheet-like originals therein.

11. A copying apparatus according to claim 9, further comprising stop means for stopping the operation of said original feeding means.

12. A copying apparatus comprising:

(a) container means for containing originals therein;

(b) conveyor means for conveying the originals from said container portion to an exposure position;

(c) image formation means for forming an image corresponding to the image of an original by exposure;

(d) setting means for setting said conveyor means to its usable condition in which it conveys the originals in response to the setting of the originals into said container portion;

(e) first time counting means for counting a predetermined time after said conveyor means has been set to said usable condition; and (f) means for releasing said usable condition when no original is set in said container portion before the time counting by said first time counting means has been terminated.

13. A copying apparatus according to claim 12, further comprising detector means for detecting that originals have been set in said container means and wherein the output of said detector means releases the time counting operation of said first time counting means.

14. A copying apparatus according to claim 13, further comprising second time counting means adapted to start time counting by the output of said detector means and wherein said conveyor means effects conveyance of an original after termination of the time counting by said second time counting means.

15. A copying apparatus according to claim 14, wherein said first time counting means starts time counting when an original is taken out of said container means before termination of the time counting by said second time counting means.

16. A copying apparatus according to claim 12, wherein said first time counting means starts time counting when image formation operation for all the originals set in said container portion has been terminated by said image formation means.

17. A copying apparatus according to claim 12, further comprising signal generating means for generating an image formation possibility signal indicative of the fact that said image formation means can effect image formation.

18. A copying apparatus according to claim 17, wherein said setting means cannot set said conveyor means to its usable condition when said image formation possibility signal is not being generated.

19. A copying apparatus according to claim 12, wherein said conveyor means has means for generating a conveyance possibility signal indicative of the fact that conveyance of the originals is possible.

20. A copying apparatus according to claim 19, wherein said setting means connot set said conveyor means to its usable condition when said conveyance possibility signal is not being generated.

21. A copying apparatus comprising:

(a) original feeding means for feeding a plurality of originals to an exposure position one by one and discharging the originals from said exposure position;

(b) light scanning means for exposing to light and reciprocally scanning the original at the exposure position;

(c) photodetector means for detecting the light from said light scanning means; and (d) inhibition means for temporally inhibiting said feeding means from feeding the next original by the output of said photodetector means after termination of the scanning of the original at the exposure position.

22. A copying apparatus according to claim 21, wherein said original feeding means has a container portion for containing unexposed originals therein.

23. A copying apparatus according to claim 22, wherein said original feeding means has a first feeding portion for feeding the originals from said container portion and a second feeding portion for discharging the originals from the exposure position, and said inhibition means inhibits the operation of said first feeding portion by the output of said photodetector means.

24. A copying apparatus according to claim 21, wherein the detection time on said photodetector means differs depending on the scanning distance of said light scanning means.

25. A copying apparatus according to claim 24, wherein said detection time is longer as the scanning distance of said light scanning means is longer.

26. A copying apparatus comprising:

(a) an original carriage surface for supporting an original document thereon for exposure to light;

(b) feeding means for feeding a sheet-like original to said carriage surface;

(c) an original positioning member displaceable between a first position proximate to said carriage surface and a second position spaced apart from said carriage surface; and (d) a mechanism responsive to said feeding means for maintaining said original positioning member at said first position when said feeding means is not used, and for displacing said original positioning member to said second position when said feeding means is used.

27. A copying apparatus according to claim 26, wherein said original positioning member is disposed parallel to the direction in which a sheet-like original is fed by said feeding means.

28. A copying apparatus according to claim 26, wherein said feeding means, when not used, is spaced apart with respect to said support surface.

29. A copying apparatus according to claim 28, further comprising a biasing member for biasing said original positioning member so as to be urged against said support surface when said feeding means is spaced apart from said support surface.

30. A copying apparatus according to claim 29, further comprising an urging member for urging said original positioning member in a direction opposite to the biasing direction of said biasing member in response to the instalment of said feeding means onto said support surface.

* * * * *

UNITED STATES PATENT AND TRADEMARK OFFICE
CERTIFICATE OF CORRECTION

PATENT NO. : 4,281,919

DATED : August 4, 1981

INVENTOR(S) : AKIHIRO NOMURA, ET AL.

It is certified that error appears in the above-identified patent and that said Letters Patent are hereby corrected as shown below:

Column 1

Line 50, change "copletely" to read --completely--.

Column 2

Line 10, change "differes" to read --differs--.

Line 49, change "balt" to read --halt--.

Column 3

Lines 47 and 48, change "temporally" to read --temporarily--.

UNITED STATES PATENT AND TRADEMARK OFFICE
CERTIFICATE OF CORRECTION

PATENT NO. : 4,281,919 Page 2 of 2

DATED : August 4, 1981

INVENTOR(S) : AKIHIRO NOMURA, ET AL.

It is certified that error appears in the above-identified patent and that said Letters Patent are hereby corrected as shown below:

Column 5

Line 39, change "are" to read --is--.

Column 15

Line 15, delete "supporting".

Column 16

Line 29, change "feedom" to read --freedom--.

Column 17

Line 2, change "agaist" to read --against--.

Signed and Sealed this

*Twenty-ninth* Day of *December 1981*

[SEAL]

*Attest:*

GERALD J. MOSSINGHOFF

*Attesting Officer* *Commissioner of Patents and Trademarks*